US012666025B2

(12) United States Patent
Sun et al.

(10) Patent No.: US 12,666,025 B2
(45) Date of Patent: Jun. 23, 2026

(54) QUANTIZATION MATRICES IN VIDEO COMPRESSION

(71) Applicant: Meta Platforms, Inc., Menlo Park, CA (US)

(72) Inventors: Yu-Chen Sun, Bellevue, WA (US); Zhijun Lei, Sammamish, WA (US); Hsiao-Chiang Chuang, Sunnyvale, CA (US); Shyam Sadhwani, Bellevue, WA (US); You Zhou, Sammamish, WA (US)

(73) Assignee: Meta Platforms, Inc., Menlo Park, CA (US)

( * ) Notice: Subject to any disclaimer, the term of this patent is extended or adjusted under 35 U.S.C. 154(b) by 0 days.

(21) Appl. No.: 18/917,938

(22) Filed: Oct. 16, 2024

(65) Prior Publication Data

US 2025/0133209 A1      Apr. 24, 2025

Related U.S. Application Data

(60) Provisional application No. 63/592,117, filed on Oct. 20, 2023.

(51) Int. Cl.
| | |
|---|---|
| *H01L 29/94* | (2006.01) |
| *H04N 19/124* | (2014.01) |
| *H04N 19/172* | (2014.01) |
| *H04N 19/196* | (2014.01) |
| *H04N 19/463* | (2014.01) |

(52) U.S. Cl.
CPC ......... *H04N 19/124* (2014.11); *H04N 19/172* (2014.11); *H04N 19/196* (2014.11); *H04N 19/463* (2014.11)

(58) Field of Classification Search
CPC .. H04N 19/124; H04N 19/172; H04N 19/196; H04N 19/463; H04N 19/126
See application file for complete search history.

(56) References Cited

U.S. PATENT DOCUMENTS

| | | | | |
|---|---|---|---|---|
| 5,535,138 A * | 7/1996 | Keith | ................... | H04N 19/149 |
| | | | | 709/247 |
| 6,810,083 B2 * | 10/2004 | Chen | .................... | H04N 17/004 |
| | | | | 375/240.03 |
| 2003/0108099 A1 * | 6/2003 | Nagumo | .................. | G06T 9/20 |
| | | | | 375/E7.199 |
| 2007/0071094 A1 * | 3/2007 | Takeda | ................. | H04N 19/174 |
| | | | | 375/E7.14 |
| 2007/0189626 A1 * | 8/2007 | Tanizawa | ............. | H04N 19/176 |
| | | | | 375/E7.199 |
| 2023/0028249 A1 * | 1/2023 | Kwong | ................ | H04N 19/124 |
| 2023/0412848 A1 * | 12/2023 | Wen | ...................... | H04N 19/137 |
| 2025/0328500 A1 * | 10/2025 | Wong | ...................... | G06F 3/013 |

* cited by examiner

*Primary Examiner* — Joseph Suh
(74) *Attorney, Agent, or Firm* — EVERSHEDS SUTHERLAND (US) LLP

(57)      ABSTRACT

An embodiment includes generating, using a first set of parameters, a first quantization matrix. The first set of parameters includes a set of coefficients of a formula that generates quantization values in the first quantization matrix. An embodiment includes encoding, using the first quantization matrix, a frame in an uncompressed video stream, the encoding generating a compressed video stream corresponding to the uncompressed video stream.

18 Claims, 5 Drawing Sheets

FIG. 5

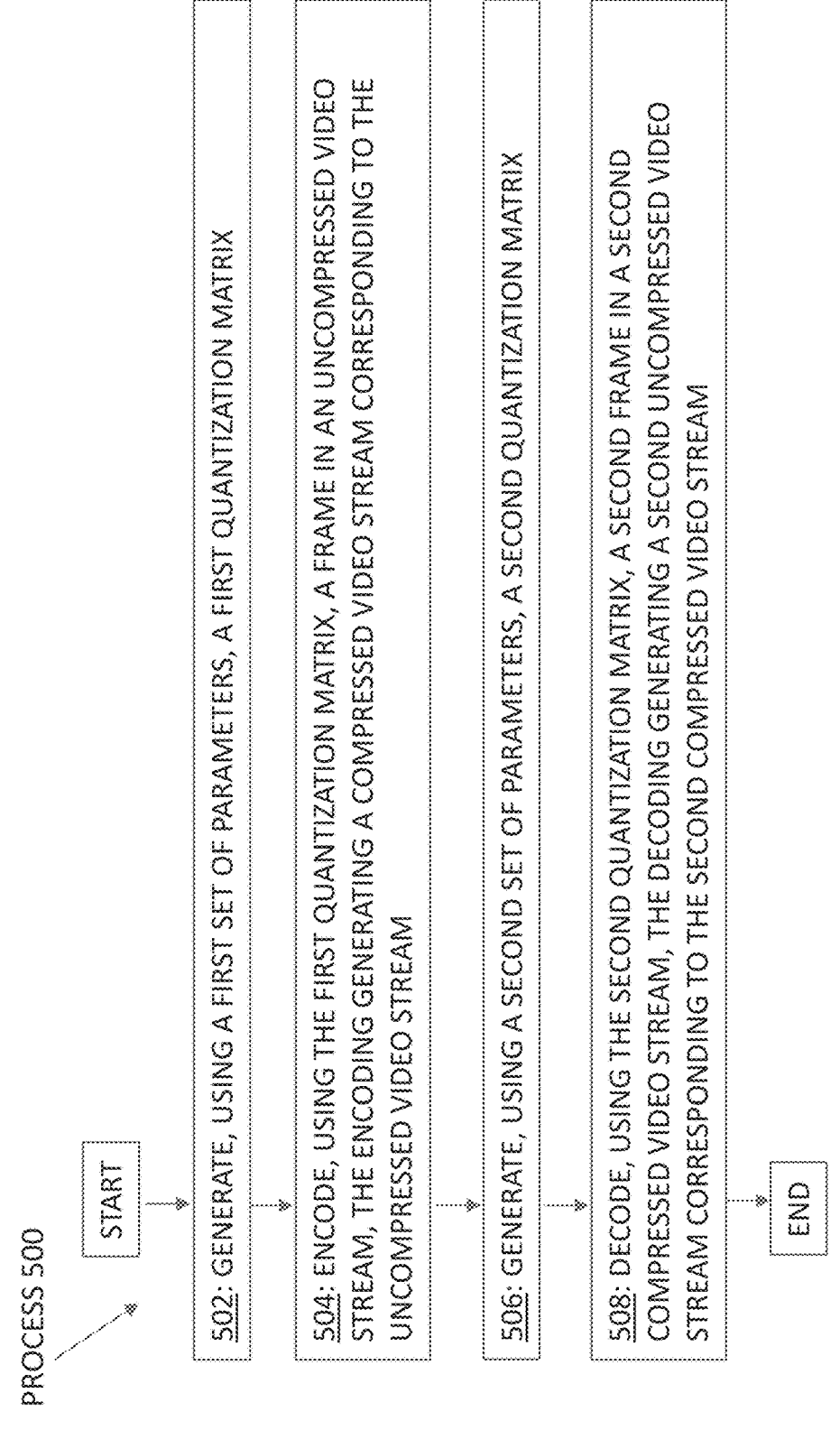

PROCESS 500

START

502: GENERATE, USING A FIRST SET OF PARAMETERS, A FIRST QUANTIZATION MATRIX

504: ENCODE, USING THE FIRST QUANTIZATION MATRIX, A FRAME IN AN UNCOMPRESSED VIDEO STREAM, THE ENCODING GENERATING A COMPRESSED VIDEO STREAM CORRESPONDING TO THE UNCOMPRESSED VIDEO STREAM

506: GENERATE, USING A SECOND SET OF PARAMETERS, A SECOND QUANTIZATION MATRIX

508: DECODE, USING THE SECOND QUANTIZATION MATRIX, A SECOND FRAME IN A SECOND COMPRESSED VIDEO STREAM, THE DECODING GENERATING A SECOND UNCOMPRESSED VIDEO STREAM CORRESPONDING TO THE SECOND COMPRESSED VIDEO STREAM

END

QUANTIZATION MATRICES IN VIDEO COMPRESSION

CROSS-REFERENCE OF RELATED APPLICATION

This application claims the benefit of U.S. Provisional Application No. 63/592,117, filed on Oct. 20, 2023, which is incorporated herein in its entirety.

TECHNICAL FIELD

The present disclosure generally relates to quantization matrix design in video compression systems, and more particularly to reducing storage cost associated with implementing quantization matrices in video compression systems.

BACKGROUND

Quantization matrix (QM) is a useful technology in video compression, which can improve the perceptual video quality. The video codec, AV1, also includes this technology. However, the current design of QM requires a large amount of storage for the coefficients. This would increase the cost of software implementation and hardware implementation. As such, there is a need for reducing storage cost of QM in video coding systems.

SUMMARY

Some embodiments of the present disclosure provide a computer-implemented method for implementing quantization matrices in video compression systems. The method includes generating, using a first set of parameters, a first quantization matrix; and encoding, using the first quantization matrix, a frame in an uncompressed video stream, the encoding generating a compressed video stream corresponding to the uncompressed video stream.

Some embodiments of the present disclosure provide a non-transitory computer-readable medium storing a program for implementing quantization matrices in video compression systems. The program, when executed by a computer, configures the computer to generate, using a first set of parameters, a first quantization matrix; and encode, using the first quantization matrix, a frame in an uncompressed video stream, the encoding generating a compressed video stream corresponding to the uncompressed video stream.

Some embodiments of the present disclosure provide a system for implementing quantization matrices in video compression systems. The system comprises a processor and a non-transitory computer-readable medium storing a set of instructions, which when executed by the processor, configure the processor to generate, using a first set of parameters, a first quantization matrix; and encode, using the first quantization matrix, a frame in an uncompressed video stream, the encoding generating a compressed video stream corresponding to the uncompressed video stream.

BRIEF DESCRIPTION OF THE DRAWINGS

To easily identify the discussion of any particular element or act, the most significant digit or digits in a reference number refer to the figure number in which that element is first introduced.

FIG. 5 depicts a flowchart of an example process for implementing quantization matrices in video compression systems, in accordance with an illustrative embodiment.

Figure 1:
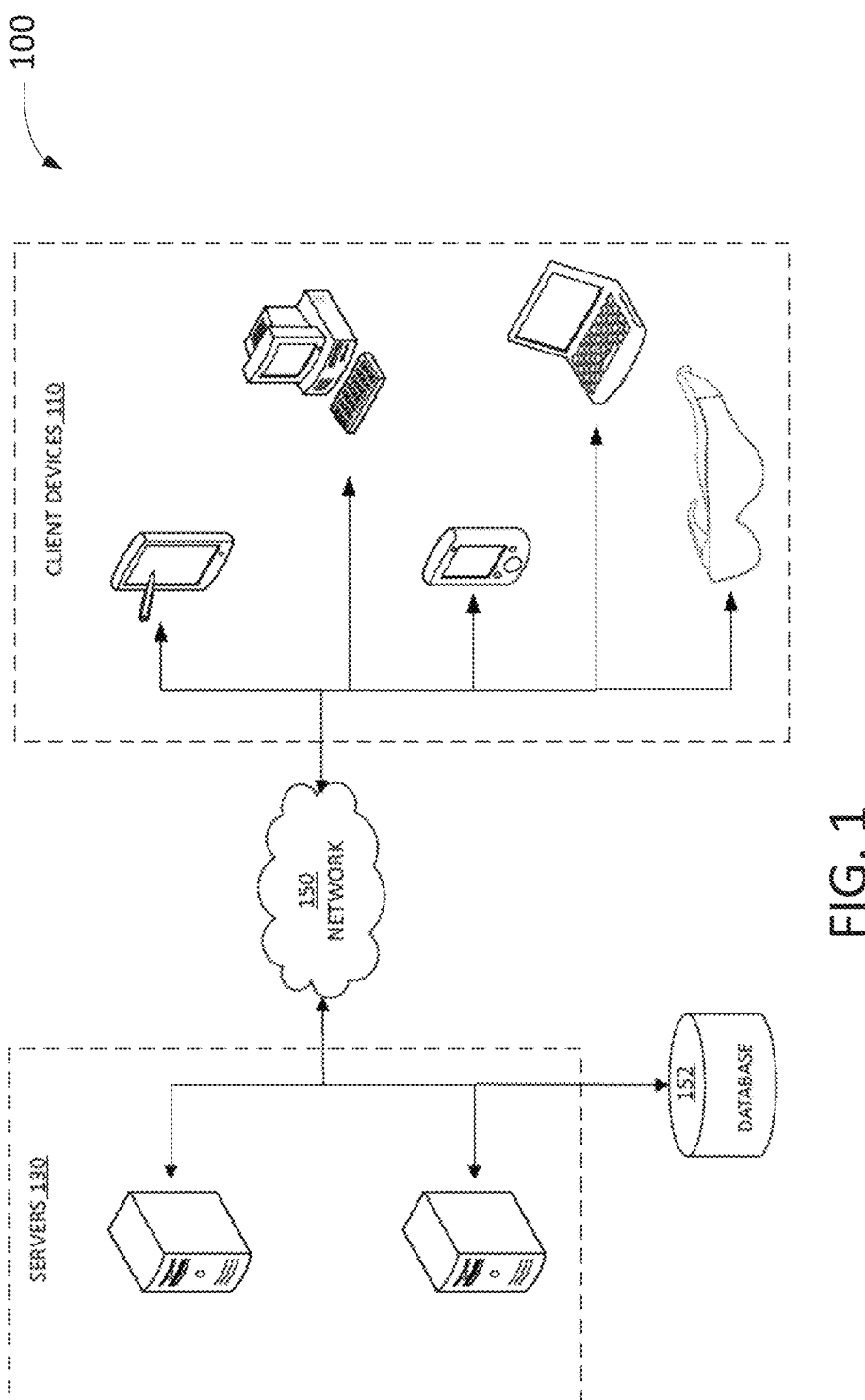
FIG. 1 illustrates a network architecture used for video coding, according to some embodiments.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

A quantizer matrix, or quantization matrix, in video compression is a key component of the quantization process. The quantization process compresses video input, reducing the amount of data required to represent a video frame or sequence. The quantization process includes mapping a range of continuous values (often represented by integers) to a finite set of discrete values based on a quantizer matrix. This reduces the precision of the data, which in turn reduces the number of bits required to represent it. A quantizer matrix is essentially a grid of values that is used to quantize the coefficients of a video frame. In video compression standards (e.g., H.264 or MPEG-4), the quantizer matrix is typically applied during the encoding process and is then reversed during decoding.

The quantizer matrix can be dynamically adjusted based on factors like the complexity of the input video (e.g., a scene) being encoded, the available bandwidth, and the desired level of compression. A higher quantization level leads to more aggressive compression but potentially introduces more noticeable artifacts. A unified quantizer matrix may be applied to the blocks, dividing pixel or frequency values of the blocks by a certain factor. To account for varying importance associated with each block and/or components of the input video, different quantization levels are applied per block. For example, some input may favor low frequency than high frequency components, and as such have reduced quantization applied to the lower frequency components.

Before applying the quantizer matrix, the video input may be divided into several blocks of data. The blocks may vary in size (e.g., 4×4, 64×64, etc.) and may be divided based thereon. Blocks may be quantized individually. In some embodiments, operations may include transformations which may be applied to transfer blocks from pixel representation to the frequency domain before applying the quantizer matrix. For example, given an 8×8 block of pixels, the pixels would be transformed to 8×8 frequency coefficient components, and the quantizer matrix would consist of 64 values, each of which would be used to quantize the corresponding frequency coefficient value in the block.

In some standard video coding specifications, there are three fundamental quantizer matrix sizes: 32×32, 32×16 and 16×32. One set of these three sizes of matrices is defined for each quantizer level (except level 15) and for each plane type (i.e., luma or chroma). All other quantizer matrix sizes may be subsampled from the set of 15 fundamental quantizer matrices. One set of quantizer matrices contains 6 tables: 3 (32×32, 32×16 and 16×32)*2 (for luma and chroma variables)*15 (to account for the 15 sets defined in the standard video coding specifications). So, the decoder has to store 61440 values: (32*32+32*16+16*32)*2 (for luma and chroma)*15 (sets). Storing the values for the three fundamental quantizer matrix sizes in order to decode the compressed video introduces significant hardware/software implementation overhead (e.g., in the application implemented on Arm64 on the Android platform, the table would take 193.5 KiB uncompressed binary size) and requires a great deal of memory/storage availability.

Embodiments of the present disclosure address the above identified problems using a method of matrix generation that mitigates quantizer matrix implementation overhead. According to embodiments, a quantizer matrix is generated based on a formula modeled, based on, or derived from the fundamental quantizer matrices of the AV1 standard. As such, rather than storing all the matrices in the specification and encoding or decoding based on a selected option from the available sets in the fundamental quantizer matrices, the formula may be solved based on preset parameters in order to generate the matrix. Embodiments may be used and incorporated into video compression standards to optimize storage, reduce computing time, and increase applicable hardware/software implementations.

According to embodiments, rather than storing all numbers in the fundamental quantizer matrices, an encoder or decoder can derive the numbers at the beginning of or during the encoding or decoding. The encoder or decoder may perform differential coding on the fundamental quantizer matrices. For example, assume two matrices: M1: [1 2 3 4 5 6 7 8] and M2: [1 2 3 4 6 6 7 8]. Differential coding may be applied to determine a difference between the two matrices. That is, with the first matrix being M1: [1 2 3 4 5 6 7 8], the difference is represented as M2-M1: [0 0 0 0 0 1 0 0]. Since there is only 1 non-zero value, the position (i.e., position: 6, value: 1) is stored to represent the value difference rather than the entire matrix M2, which reduces the storage overhead significantly.

In some implementations, the encoder or decoder will only need to store one set of the quantizer matrices (e.g., the first set). Then, the encoder or decoder stores the difference between other matrix sets and the first set. In some implementations, run-length coding is applied to determine and store the difference.

According to embodiments, the fundamental quantizer matrices are made derivable so that the encoder or decoder can derive the matrix instead of storing all numbers in the matrix. In some implementations, a set of parameters contributing to the design of the derivable quantizer matrix formula may include the low frequency component being more important than the high frequency component. Accordingly, the formula to generate the quantizer values from high values to low values can be designed based on this set of parameters. In some embodiments, the formula could have a parameter to control a decay rate. The formula and different decay rates may be used to generate different sets of quantizer matrices.

In some embodiments, the formula may be applied on AC frequency components (i.e., the quantizer value of the position, (x, y), where x>0 and y>0). The quantizer value of the DC coefficient may be set to a value larger than the value for the first AC frequency component. By non-limiting example, the quantizer values for DC to the 7th AC component could be (32, 31, 31, 32, 35, 40, 70, 80).

According to embodiments, video coding overhead and overall cost of the system is reduced based on the design implementing the formula because the decoder does not have to store the values in all quantizer matrix sets. Instead, the encoder or decoder stores the formula and the different decay rates and generates the quantizer matrix sets.

According to embodiments, an exemplary formula to generate the quantizer value q of the position, (x, y), may be as follows (hereafter referred to as "first equation"):

$$q = a*x^2 + b*x*y + c*y^2 + d*x + e*y + f \qquad \text{Equation (1)}$$

where x and y are the horizontal and vertical positions in a transform block. The parameters denoted by a, b, c, d, e, and f can be pre-defined or signaled in the bitstream.

For example, assuming a=1, b=0, c=1, d=0, e=0, and f=32, the 4×4 quantizer matrix table would be:
{32, 33, 36, 41,
33, 34, 37, 42,
36, 37, 40, 45,
41, 42, 45, 50}

Accordingly, only the coefficients and the quadratic equation (i.e., first equation) are stored, and the quantization matrix is generated. Exemplary results of the first equation to generate a matrix assuming a=1, b=0, c=1, d=0, e=0, and f=32 are illustrated in Table 1 below.

TABLE 1

| plan: Luma TX size: 32 × 32 | | | | | |
|---|---|---|---|---|---|
| 0.043752 | 0.063055 | 0.043752 | 1.028218 | 1.028218 | 26.116737 |
| 0.042984 | 0.053741 | 0.042984 | 0.910965 | 0.910965 | 25.549005 |
| 0.044487 | 0.046675 | 0.044487 | 0.701001 | 0.701001 | 25.975246 |
| 0.048404 | 0.041298 | 0.048404 | 0.402378 | 0.402378 | 27.287533 |
| 0.052831 | 0.037762 | 0.052831 | 0.056496 | 0.056496 | 29.347552 |
| 0.055424 | 0.034065 | 0.055424 | −0.257211 | −0.257211 | 31.433786 |
| 0.053534 | 0.029998 | 0.053534 | −0.466639 | −0.466639 | 33.100561 |
| 0.043490 | 0.026139 | 0.043490 | −0.452567 | −0.452567 | 33.163526 |
| 0.035129 | 0.023169 | 0.035129 | −0.462165 | −0.462165 | 33.633024 |
| 0.026513 | 0.020696 | 0.026513 | −0.440643 | −0.440643 | 33.900431 |
| 0.019819 | 0.017345 | 0.019819 | −0.429317 | −0.429317 | 34.365212 |
| 0.009995 | 0.012277 | 0.009995 | −0.264608 | −0.264608 | 33.483943 |
| 0.003619 | 0.004599 | 0.003619 | −0.087891 | −0.087891 | 32.067590 |
| −0.000615 | 0.000715 | −0.000615 | 0.039142 | 0.039142 | 30.922108 |
| −0.001754 | 0.001033 | −0.001754 | 0.066217 | 0.066217 | 30.392519 |
| TX size: 32 × 16 | | | | | |
| 0.005277 | 0.066596 | 0.144953 | 0.889024 | 3.301606 | 38.372166 |
| 0.006405 | 0.058533 | 0.146769 | 0.831751 | 2.894832 | 37.072102 |
| 0.008355 | 0.052522 | 0.160107 | 0.742448 | 2.286095 | 36.353171 |
| 0.011340 | 0.048418 | 0.184163 | 0.591520 | 1.526597 | 36.113748 |
| 0.013426 | 0.050962 | 0.206440 | 0.412161 | 0.659987 | 36.664961 |
| 0.015937 | 0.054015 | 0.218701 | 0.255467 | −0.143062 | 36.550614 |
| 0.013468 | 0.038689 | 0.214395 | 0.178690 | −0.486006 | 36.241610 |
| 0.010917 | 0.036540 | 0.173691 | 0.088820 | −0.564386 | 35.386872 |
| 0.009128 | 0.028351 | 0.141938 | 0.042548 | −0.581109 | 34.459016 |

5          6

TABLE 1-continued

| | | | | | |
|---|---|---|---|---|---|
| 0.007926 | 0.026538 | 0.106760 | −0.045651 | −0.601156 | 34.078069 |
| 0.005767 | 0.021428 | 0.080056 | −0.082672 | −0.606734 | 33.687131 |
| 0.002760 | 0.015498 | 0.041158 | −0.067584 | −0.367920 | 32.825542 |
| 0.000571 | 0.004833 | 0.015384 | −0.002119 | −0.097684 | 31.774767 |
| 0.000218 | 0.001076 | −0.000202 | 0.006012 | 0.050563 | 31.333605 |
| −0.000507 | 0.000756 | −0.007550 | 0.024330 | 0.150239 | 30.767818 |

TX size: 16 × 32

| | | | | | |
|---|---|---|---|---|---|
| 0.086840 | 0.041178 | 0.015468 | 0.726650 | 2.227191 | 41.084329 |
| 0.065241 | 0.035017 | 0.022354 | 0.922790 | 1.902609 | 39.124896 |
| 0.047679 | 0.029491 | 0.030738 | 1.076456 | 1.539743 | 37.172000 |
| 0.042794 | 0.026101 | 0.043073 | 1.048193 | 1.011126 | 36.419194 |
| 0.051142 | 0.024825 | 0.053836 | 0.811308 | 0.492708 | 36.201851 |
| 0.066083 | 0.025414 | 0.060343 | 0.405690 | 0.031162 | 36.610245 |
| 0.075816 | 0.021451 | 0.056404 | 0.050849 | −0.170765 | 36.399872 |
| 0.057379 | 0.017088 | 0.043649 | 0.038886 | −0.130479 | 34.882583 |
| 0.039763 | 0.012637 | 0.036117 | 0.085443 | −0.171818 | 33.742905 |
| 0.022475 | 0.011764 | 0.032076 | 0.113716 | −0.318318 | 33.331690 |
| 0.013366 | 0.014103 | 0.022895 | 0.022320 | −0.314653 | 33.009874 |
| 0.007862 | 0.012944 | 0.010113 | −0.069990 | −0.161181 | 32.525464 |
| 0.006018 | 0.003146 | 0.002996 | −0.032600 | −0.013851 | 31.601131 |
| −0.004065 | 0.001006 | 0.000589 | 0.086884 | 0.012462 | 31.147846 |
| −0.001455 | 0.001177 | −0.002001 | 0.039342 | 0.081969 | 30.670970 | plan: Chroma
TX size: 32 × 32

| | | | | | |
|---|---|---|---|---|---|
| −0.002221 | 0.025150 | −0.002221 | 1.013697 | 1.013697 | 33.679593 |
| 0.000444 | 0.023866 | 0.000444 | 0.888655 | 0.888655 | 33.827103 |
| 0.003902 | 0.022295 | 0.003902 | 0.743152 | 0.743152 | 34.132100 |
| 0.008027 | 0.021515 | 0.008027 | 0.557400 | 0.557400 | 34.935398 |
| 0.011976 | 0.020192 | 0.011976 | 0.373356 | 0.373356 | 35.782372 |
| 0.013919 | 0.018232 | 0.013919 | 0.237168 | 0.237168 | 36.316417 |
| 0.011739 | 0.013556 | 0.011739 | 0.244410 | 0.244410 | 35.650051 |
| 0.006021 | 0.007778 | 0.006021 | 0.367838 | 0.367838 | 33.917423 |
| 0.001718 | 0.001489 | 0.001718 | 0.486223 | 0.486223 | 31.953565 |
| −0.001448 | −0.006311 | −0.001448 | 0.627654 | 0.627654 | 29.204697 |
| −0.000273 | −0.015320 | −0.000273 | 0.692496 | 0.692496 | 26.498148 |
| 0.007477 | −0.015977 | 0.007477 | 0.468969 | 0.468969 | 26.107357 |
| 0.010433 | −0.001057 | 0.010433 | 0.072049 | 0.072049 | 28.990004 |
| 0.007908 | 0.004265 | 0.007908 | −0.151344 | −0.151344 | 31.602784 |
| −0.000713 | 0.001350 | −0.000713 | 0.001811 | 0.001811 | 31.042073 |

TX size: 32 × 16

| | | | | | |
|---|---|---|---|---|---|
| −0.002136 | 0.027130 | −0.015045 | 0.499154 | 2.433748 | 41.381510 |
| −0.001091 | 0.025837 | −0.004962 | 0.463529 | 2.196708 | 40.796924 |
| −0.000124 | 0.024637 | 0.011018 | 0.429177 | 1.854325 | 40.450235 |
| 0.002002 | 0.024787 | 0.029609 | 0.338435 | 1.442818 | 40.538958 |
| 0.002978 | 0.025735 | 0.045496 | 0.269618 | 1.032996 | 40.629261 |
| 0.003959 | 0.025689 | 0.053303 | 0.234191 | 0.699656 | 40.070111 |
| 0.003160 | 0.017966 | 0.047192 | 0.199308 | 0.652794 | 39.556519 |
| 0.000846 | 0.011862 | 0.024915 | 0.248385 | 0.798113 | 37.821232 |
| 0.000109 | 0.002214 | 0.009361 | 0.281151 | 0.960984 | 36.176109 |
| −0.000697 | −0.004879 | −0.004081 | 0.317855 | 1.091618 | 34.484848 |
| −0.001275 | −0.014392 | 0.001056 | 0.382689 | 1.101040 | 32.248322 |
| 0.000735 | −0.015955 | 0.031348 | 0.338739 | 0.662368 | 31.022435 |
| 0.001424 | −0.000702 | 0.039385 | 0.166747 | 0.186134 | 30.840916 |
| 0.003698 | 0.004955 | 0.031179 | −0.031936 | −0.201248 | 31.544438 |
| 0.000275 | 0.002467 | 0.004142 | −0.018525 | −0.071731 | 31.239089 |

TX size: 16 × 32

| | | | | | |
|---|---|---|---|---|---|
| 0.023394 | 0.005450 | −0.007258 | 0.581071 | 1.437397 | 41.942256 |
| 0.016112 | 0.001976 | −0.002763 | 0.718181 | 1.297914 | 40.637687 |
| 0.011008 | 0.000158 | 0.002115 | 0.794204 | 1.131352 | 39.635075 |
| 0.012736 | −0.000623 | 0.008600 | 0.765940 | 0.891495 | 39.156814 |
| 0.022321 | −0.002393 | 0.014076 | 0.643905 | 0.674682 | 38.722698 |
| 0.037810 | −0.003267 | 0.017667 | 0.374984 | 0.477450 | 38.839516 |
| 0.046404 | −0.007294 | 0.014276 | 0.198426 | 0.466807 | 38.197478 |
| 0.044052 | −0.009255 | 0.006980 | 0.098662 | 0.552801 | 37.323550 |
| 0.037011 | −0.006873 | 0.001186 | −0.001988 | 0.602691 | 36.977461 |
| 0.015800 | −0.007850 | −0.002446 | 0.225023 | 0.644049 | 35.302083 |
| −0.003051 | −0.010694 | −0.004246 | 0.549038 | 0.681151 | 32.628558 |
| 0.010734 | −0.012452 | 0.003080 | 0.397530 | 0.473530 | 31.346591 |
| 0.000487 | −0.001591 | 0.005372 | 0.333204 | 0.246725 | 30.331328 |
| −0.001592 | 0.004118 | 0.014043 | 0.156885 | −0.236760 | 31.303121 |
| −0.000684 | 0.003108 | 0.000181 | −0.020867 | −0.013099 | 31.103665 |

In some embodiments, least-square fitting is used to fit the generated values to better mimic, for example, matrices in the AV1 standard. To further refine the data, each of the data values may be converted to (e.g., 16-bit) floating point. Exemplary results of the first equation using fix point representation are illustrated in Table 2 below.

TABLE 2 plan: Luma
TX size: 32 × 32

| | | | | | |
|---|---|---|---|---|---|
| $^{22}/_{512}$ | $^{32}/_{512}$ | $^{22}/_{512}$ | $^{33}/_{32}$ | $^{33}/_{32}$ | 26 |
| $^{22}/_{512}$ | $^{28}/_{512}$ | $^{22}/_{512}$ | $^{29}/_{32}$ | $^{29}/_{32}$ | 26 |
| $^{23}/_{512}$ | $^{24}/_{512}$ | $^{23}/_{512}$ | $^{22}/_{32}$ | $^{22}/_{32}$ | 26 |
| $^{25}/_{512}$ | $^{21}/_{512}$ | $^{25}/_{512}$ | $^{13}/_{32}$ | $^{13}/_{32}$ | 27 |
| $^{27}/_{512}$ | $^{19}/_{512}$ | $^{27}/_{512}$ | $^{2}/_{32}$ | $^{2}/_{32}$ | 29 |
| $^{28}/_{512}$ | $^{17}/_{512}$ | $^{28}/_{512}$ | $−^{8}/_{32}$ | $−^{8}/_{32}$ | 31 |
| $^{27}/_{512}$ | $^{15}/_{512}$ | $^{27}/_{512}$ | $−^{15}/_{32}$ | $−^{15}/_{32}$ | 33 |
| $^{22}/_{512}$ | $^{13}/_{512}$ | $^{22}/_{512}$ | $−^{14}/_{32}$ | $−^{14}/_{32}$ | 33 |
| $^{18}/_{512}$ | $^{12}/_{512}$ | $^{18}/_{512}$ | $−^{15}/_{32}$ | $−^{15}/_{32}$ | 34 |
| $^{14}/_{512}$ | $^{11}/_{512}$ | $^{14}/_{512}$ | $−^{14}/_{32}$ | $−^{14}/_{32}$ | 34 |
| $^{10}/_{512}$ | $^{9}/_{512}$ | $^{10}/_{512}$ | $−^{14}/_{32}$ | $−^{14}/_{32}$ | 34 |
| $^{5}/_{512}$ | $^{6}/_{512}$ | $^{5}/_{512}$ | $−^{8}/_{32}$ | $−^{8}/_{32}$ | 33 |
| $^{2}/_{512}$ | $^{2}/_{512}$ | $^{2}/_{512}$ | $−^{3}/_{32}$ | $−^{3}/_{32}$ | 32 |
| $^{0}/_{512}$ | $^{0}/_{512}$ | $^{0}/_{512}$ | $^{1}/_{32}$ | $^{1}/_{32}$ | 31 |
| $−^{1}/_{512}$ | $^{1}/_{512}$ | $−^{1}/_{512}$ | $^{2}/_{32}$ | $^{2}/_{32}$ | 30 |

TX size: 32 × 16

| | | | | | |
|---|---|---|---|---|---|
| $^{3}/_{512}$ | $^{34}/_{512}$ | $^{74}/_{512}$ | $^{28}/_{32}$ | $^{106}/_{32}$ | 38 |
| $^{3}/_{512}$ | $^{30}/_{512}$ | $^{75}/_{512}$ | $^{27}/_{32}$ | $^{93}/_{32}$ | 37 |
| $^{4}/_{512}$ | $^{27}/_{512}$ | $^{82}/_{512}$ | $^{24}/_{32}$ | $^{73}/_{32}$ | 36 |
| $^{6}/_{512}$ | $^{25}/_{512}$ | $^{94}/_{512}$ | $^{19}/_{32}$ | $^{49}/_{32}$ | 36 |
| $^{7}/_{512}$ | $^{26}/_{512}$ | $^{106}/_{512}$ | $^{13}/_{32}$ | $^{21}/_{32}$ | 37 |
| $^{8}/_{512}$ | $^{28}/_{512}$ | $^{112}/_{512}$ | $^{8}/_{32}$ | $−^{5}/_{32}$ | 37 |
| $^{7}/_{512}$ | $^{20}/_{512}$ | $^{110}/_{512}$ | $^{6}/_{32}$ | $−^{16}/_{32}$ | 36 |
| $^{6}/_{512}$ | $^{19}/_{512}$ | $^{89}/_{512}$ | $^{3}/_{32}$ | $−^{18}/_{32}$ | 35 |
| $^{5}/_{512}$ | $^{15}/_{512}$ | $^{73}/_{512}$ | $^{1}/_{32}$ | $−^{19}/_{32}$ | 34 |
| $^{4}/_{512}$ | $^{14}/_{512}$ | $^{55}/_{512}$ | $−^{1}/_{32}$ | $−^{19}/_{32}$ | 34 |
| $^{3}/_{512}$ | $^{11}/_{512}$ | $^{41}/_{512}$ | $−^{3}/_{32}$ | $−^{19}/_{32}$ | 34 |
| $^{1}/_{512}$ | $^{8}/_{512}$ | $^{21}/_{512}$ | $−^{2}/_{32}$ | $−^{12}/_{32}$ | 33 |
| $^{0}/_{512}$ | $^{2}/_{512}$ | $^{8}/_{512}$ | $^{0}/_{32}$ | $−^{3}/_{32}$ | 32 |
| $^{0}/_{512}$ | $^{1}/_{512}$ | $^{0}/_{512}$ | $^{0}/_{32}$ | $^{2}/_{32}$ | 31 |
| $^{0}/_{512}$ | $^{0}/_{512}$ | $−^{4}/_{512}$ | $^{1}/_{32}$ | $^{5}/_{32}$ | 31 |

TX size: 16 × 32

| | | | | | |
|---|---|---|---|---|---|
| $^{44}/_{512}$ | $^{21}/_{512}$ | $^{8}/_{512}$ | $^{23}/_{32}$ | $^{71}/_{32}$ | 41 |
| $^{33}/_{512}$ | $^{18}/_{512}$ | $^{11}/_{512}$ | $^{30}/_{32}$ | $^{61}/_{32}$ | 39 |
| $^{24}/_{512}$ | $^{15}/_{512}$ | $^{16}/_{512}$ | $^{34}/_{32}$ | $^{49}/_{32}$ | 37 |
| $^{22}/_{512}$ | $^{13}/_{512}$ | $^{22}/_{512}$ | $^{34}/_{32}$ | $^{32}/_{32}$ | 36 |
| $^{26}/_{512}$ | $^{13}/_{512}$ | $^{28}/_{512}$ | $^{26}/_{32}$ | $^{16}/_{32}$ | 36 |
| $^{34}/_{512}$ | $^{13}/_{512}$ | $^{31}/_{512}$ | $^{13}/_{32}$ | $^{1}/_{32}$ | 37 |
| $^{39}/_{512}$ | $^{11}/_{512}$ | $^{29}/_{512}$ | $^{2}/_{32}$ | $−^{5}/_{32}$ | 36 |
| $^{29}/_{512}$ | $^{9}/_{512}$ | $^{22}/_{512}$ | $^{1}/_{32}$ | $−^{4}/_{32}$ | 35 |
| $^{20}/_{512}$ | $^{6}/_{512}$ | $^{18}/_{512}$ | $^{3}/_{32}$ | $−^{5}/_{32}$ | 34 |
| $^{12}/_{512}$ | $^{6}/_{512}$ | $^{16}/_{512}$ | $^{4}/_{32}$ | $−^{10}/_{32}$ | 33 |
| $^{7}/_{512}$ | $^{7}/_{512}$ | $^{12}/_{512}$ | $^{1}/_{32}$ | $−^{10}/_{32}$ | 33 |
| $^{4}/_{512}$ | $^{7}/_{512}$ | $^{5}/_{512}$ | $−^{2}/_{32}$ | $−^{5}/_{32}$ | 33 |
| $^{3}/_{512}$ | $^{2}/_{512}$ | $^{2}/_{512}$ | $−^{1}/_{32}$ | $^{0}/_{32}$ | 32 |
| $−^{2}/_{512}$ | $^{1}/_{512}$ | $^{0}/_{512}$ | $^{3}/_{32}$ | $^{0}/_{32}$ | 31 |
| $−^{1}/_{512}$ | $^{1}/_{512}$ | $−^{1}/_{512}$ | $^{1}/_{32}$ | $^{3}/_{32}$ | 31 | plan: Chroma
TX size: 32 × 32

| | | | | | |
|---|---|---|---|---|---|
| $−^{1}/_{512}$ | $^{13}/_{512}$ | $−^{1}/_{512}$ | $^{32}/_{32}$ | $^{32}/_{32}$ | 34 |
| $^{0}/_{512}$ | $^{12}/_{512}$ | $^{0}/_{512}$ | $^{28}/_{32}$ | $^{28}/_{32}$ | 34 |
| $^{2}/_{512}$ | $^{11}/_{512}$ | $^{2}/_{512}$ | $^{24}/_{32}$ | $^{24}/_{32}$ | 34 |
| $^{4}/_{512}$ | $^{11}/_{512}$ | $^{4}/_{512}$ | $^{18}/_{32}$ | $^{18}/_{32}$ | 35 |
| $^{6}/_{512}$ | $^{10}/_{512}$ | $^{6}/_{512}$ | $^{12}/_{32}$ | $^{12}/_{32}$ | 36 |
| $^{7}/_{512}$ | $^{9}/_{512}$ | $^{7}/_{512}$ | $^{8}/_{32}$ | $^{8}/_{32}$ | 36 |
| $^{6}/_{512}$ | $^{7}/_{512}$ | $^{6}/_{512}$ | $^{8}/_{32}$ | $^{8}/_{32}$ | 36 |
| $^{3}/_{512}$ | $^{4}/_{512}$ | $^{3}/_{512}$ | $^{12}/_{32}$ | $^{12}/_{32}$ | 34 |
| $^{1}/_{512}$ | $^{1}/_{512}$ | $^{1}/_{512}$ | $^{16}/_{32}$ | $^{16}/_{32}$ | 32 |
| $−^{1}/_{512}$ | $−^{3}/_{512}$ | $−^{1}/_{512}$ | $^{20}/_{32}$ | $^{20}/_{32}$ | 29 |
| $^{0}/_{512}$ | $−^{8}/_{512}$ | $^{0}/_{512}$ | $^{22}/_{32}$ | $^{22}/_{32}$ | 26 |
| $^{4}/_{512}$ | $−^{8}/_{512}$ | $^{4}/_{512}$ | $^{15}/_{32}$ | $^{15}/_{32}$ | 26 |
| $^{5}/_{512}$ | $−^{1}/_{512}$ | $^{5}/_{512}$ | $^{2}/_{32}$ | $^{2}/_{32}$ | 29 |
| $^{4}/_{512}$ | $^{2}/_{512}$ | $^{4}/_{512}$ | $−^{5}/_{32}$ | $−^{5}/_{32}$ | 32 |
| $^{0}/_{512}$ | $^{1}/_{512}$ | $^{0}/_{512}$ | $^{0}/_{32}$ | $^{0}/_{32}$ | 31 |

TX size: 32 × 16

| | | | | | |
|---|---|---|---|---|---|
| $−^{1}/_{512}$ | $^{14}/_{512}$ | $−^{8}/_{512}$ | $^{16}/_{32}$ | $^{78}/_{32}$ | 41 |
| $−^{1}/_{512}$ | $^{13}/_{512}$ | $−^{3}/_{512}$ | $^{15}/_{32}$ | $^{70}/_{32}$ | 41 |
| $^{0}/_{512}$ | $^{13}/_{512}$ | $^{6}/_{512}$ | $^{14}/_{32}$ | $^{59}/_{32}$ | 40 |

TABLE 2-continued

| | | | | | |
|---|---|---|---|---|---|
| $1/512$ | $13/512$ | $15/512$ | $11/32$ | $46/32$ | 41 |
| $2/512$ | $13/512$ | $23/512$ | $9/32$ | $33/32$ | 41 |
| $2/512$ | $13/512$ | $27/512$ | $7/32$ | $22/32$ | 40 |
| $2/512$ | $9/512$ | $24/512$ | $6/32$ | $21/32$ | 40 |
| $0/512$ | $6/512$ | $13/512$ | $8/32$ | $26/32$ | 38 |
| $0/512$ | $1/512$ | $5/512$ | $9/32$ | $31/32$ | 36 |
| $0/512$ | $-2/512$ | $-2/512$ | $10/32$ | $35/32$ | 34 |
| $-1/512$ | $-7/512$ | $1/512$ | $12/32$ | $35/32$ | 32 |
| $0/512$ | $-8/512$ | $16/512$ | $11/32$ | $21/32$ | 31 |
| $1/512$ | $0/512$ | $20/512$ | $5/32$ | $6/32$ | 31 |
| $2/512$ | $3/512$ | $16/512$ | $-1/32$ | $-6/32$ | 32 |
| $0/512$ | $1/512$ | $2/512$ | $-1/32$ | $-2/32$ | 31 |
| TX size: 16 × 32 | | | | | |
| $12/512$ | $3/512$ | $-4/512$ | $19/32$ | $46/32$ | 42 |
| $8/512$ | $1/512$ | $-1/512$ | $23/32$ | $42/32$ | 41 |
| $6/512$ | $0/512$ | $1/512$ | $25/32$ | $36/32$ | 40 |
| $7/512$ | $0/512$ | $4/512$ | $25/32$ | $29/32$ | 39 |
| $11/512$ | $-1/512$ | $7/512$ | $21/32$ | $22/32$ | 39 |
| $19/512$ | $-2/512$ | $9/512$ | $12/32$ | $15/32$ | 39 |
| $24/512$ | $-4/512$ | $7/512$ | $6/32$ | $15/32$ | 38 |
| $23/512$ | $-5/512$ | $4/512$ | $3/32$ | $18/32$ | 37 |
| $19/512$ | $-4/512$ | $1/512$ | $0/32$ | $19/32$ | 37 |
| $8/512$ | $-4/512$ | $-1/512$ | $7/32$ | $21/32$ | 35 |
| $-2/512$ | $-5/512$ | $-2/512$ | $18/32$ | $22/32$ | 33 |
| $5/512$ | $-6/512$ | $2/512$ | $13/32$ | $15/32$ | 31 |
| $0/512$ | $-1/512$ | $3/512$ | $11/32$ | $8/32$ | 30 |
| $-1/512$ | $2/512$ | $7/512$ | $5/32$ | $-8/32$ | 31 |
| $0/512$ | $2/512$ | $0/512$ | $-1/32$ | $0/32$ | 31 |

According to some embodiments, an exemplary formula to generate the quantizer value q from the position (x, y), may be as follows (hereafter referred to as "second equation"):

$$q = f * e^{\wedge}(g * (x + y)) \qquad \text{Equation (2)}$$

where x and y are the horizontal and vertical positions in a transform block. In some embodiments, the parameters denoted by e, f, and g may be pre-defined or signaled in the bitstream (e.g., based on the input video).

FIG. 1 illustrates a network architecture 100 used to implement video coding, according to some embodiments. Architecture 100 may include servers 130 and a database 152, communicatively coupled with multiple client devices 110 via a network 150. Client devices 110 may include any one of a laptop computer, a desktop computer, or a mobile device such as a smart phone, a palm device, video player, or a tablet device. The database 152 may store backup files from, for example, matrices, videos, and processing data.

Network 150 can include, for example, any one or more of a local area network (LAN), a wide area network (WAN), the Internet, and the like. Further, network 150 can include, but is not limited to, any one or more of the following network topologies, including a bus network, a star network, a ring network, a mesh network, a star-bus network, tree or hierarchical network, and the like.

Figure 2:
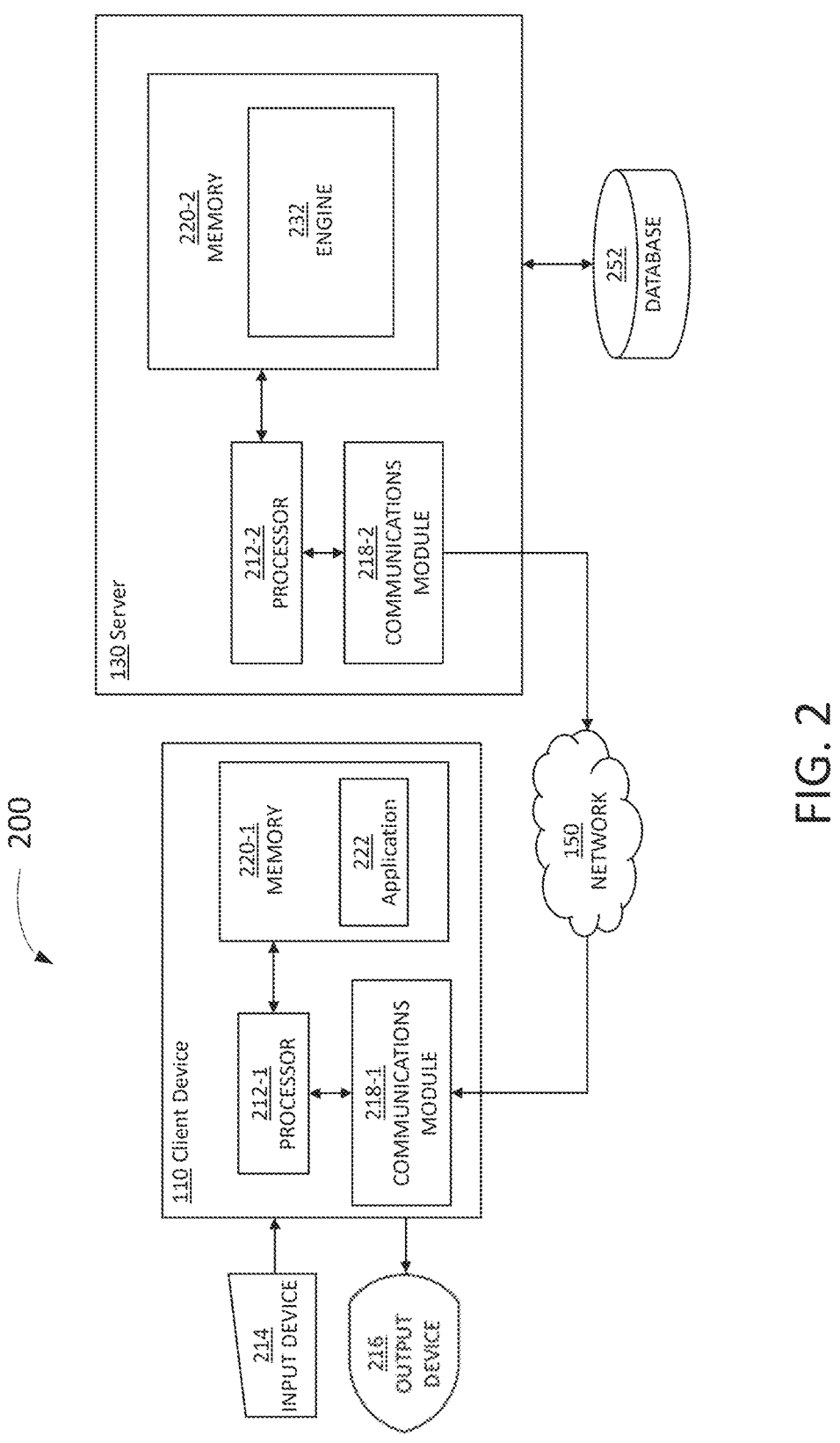
FIG. 2 is a block diagram illustrating details of devices used in the architecture of FIG. 1, according to some embodiments.

FIG. 2 is a block diagram 200 illustrating details of a client device 110 and a server 130 used in a network architecture as disclosed herein (e.g., architecture 100), according to some embodiments. Client device 110 and server 130 are communicatively coupled over network 150 via respective communications modules 218-1 and 218-2 (hereinafter, collectively referred to as "communications modules 218"). Communications modules 218 are configured to interface with network 150 to send and receive information, such as requests, uploads, messages, and commands to other devices on the network 150. Communications modules 218 can be, for example, modems or Ethernet cards, and may include radio hardware and software for wireless communications (e.g., via electromagnetic radiation, such as radiofrequency (RF), near field communications (NFC), Wi-Fi, and Bluetooth radio technology). Client device 110 may be coupled with an input device 214 and with an output device 216. A user may interact with client device 110 via the input device 214 and the output device 216. Input device 214 may include a mouse, a keyboard, a pointer, a touchscreen, a microphone, a joystick, a virtual joystick, a touch-screen display that a user may use to interact with client device 110, or the like. In some embodiments, input device 214 may include cameras, microphones, and sensors, such as touch sensors, acoustic sensors, inertial motion units (IMUs) and other sensors configured to provide input data to a VR/AR headset. Output device 216 may be a screen display, a touchscreen, a speaker, and the like.

Client device 110 may also include a processor 212-1, configured to execute instructions stored in a memory 220-1, and to cause client device 110 to perform at least some operations in methods consistent with the present disclosure. Memory 220-1 may further include an application 222, configured to run in client device 110 and couple with input device 214 and output device 216. The application 222 may be downloaded by the user from server 130 and may be hosted by server 130. The application 222 includes specific instructions which, when executed by processor 212-1, cause operations to be performed according to methods described herein. In some embodiments, the application 222 runs on an operating system (OS) installed in client device 110. In some embodiments, application 222 may run out of a web browser. In some embodiments, the processor is configured to control a graphical user interface (GUI) for the user of one of client devices 110 accessing the server of the social platform.

A database 252 may store data and files associated with the social platform from the application 222. In some embodiments, client device 110 is a mobile phone used to collect a video or picture and upload to server 130 using a video or image collection application 222, to store in the database 252.

Server 130 includes a memory 220-2, a processor 212-2, and communications module 218-2. Hereinafter, processors 212-1 and 212-2, and memories 220-1 and 220-2, will be collectively referred to, respectively, as "processors 212" and "memories 220." Processors 212 are configured to execute instructions stored in memories 220. In some embodiments, memory 220-2 includes an engine 232. The engine 232 may be configured to perform operations and methods according to aspects of embodiments. The engine 232 may share or provide features and resources with the client device, including multiple tools associated with image or video collection, capture, or design applications that use images or pictures retrieved with engine 232 (e.g., application 222). The user may access engine 232 through application 222, installed in a memory 220-1 of client device 110. Accordingly, application 222 may be installed by server 130 and perform scripts and other routines provided by server 130 through any one of multiple tools. Execution of application 222 may be controlled by processor 212-1.

Figure 3:
FIG. 3 is a block diagram illustrating a computer system used to at least partially carry out one or more of operations in methods disclosed herein, according to some embodiments.
Figure 3:
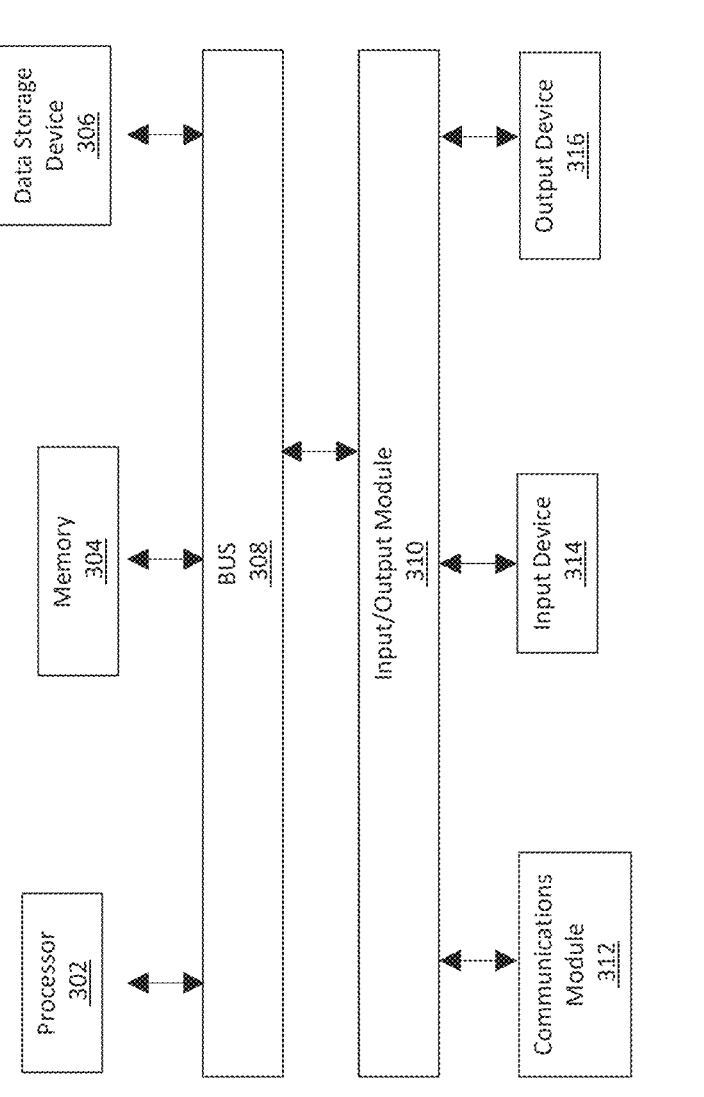

FIG. 3 is a block diagram illustrating an exemplary computer system 300 with which aspects of the subject technology can be implemented. In certain aspects, the computer system 300 may be implemented using hardware or a combination of software and hardware, either in a dedicated server, integrated into another entity, or distributed across multiple entities.

Computer system 300 (e.g., server and/or client) includes a bus 308 or other communication mechanism for communicating information, and a processor 302 coupled with bus 308 for processing information. By way of example, the computer system 300 may be implemented with one or more processors 302. Processor 302 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 300 can include, in addition to hardware, code that creates an execution environment for the computer program in question, e.g., code that constitutes processor firmware, a protocol stack, a database management system, an operating system, or a combination of one or more of them stored in an included memory 304, such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled to bus 308 for storing information and instructions to be executed by processor 302. The processor 302 and the memory 304 can be supplemented by, or incorporated in, special purpose logic circuitry.

The instructions may be stored in the memory 304 and implemented in one or more computer program products, i.e., one or more modules of computer program instructions encoded on a computer-readable medium for execution by, or to control the operation of, the computer system 300, and according to any method well-known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 304 may also be used for storing temporary variable or other intermediate information during execution of instructions to be executed by processor 302.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 300 further includes a data storage device 306 such as a magnetic disk or optical disk, coupled to bus 308 for storing information and instructions. Computer system 300 may be coupled via input/output module 310 to various devices. The input/output module 310 can be any input/output module. Exemplary input/output modules 310 include data ports such as USB ports. The input/output module 310 is configured to connect to a communications module 312. Exemplary communications modules 312 include networking interface cards, such as Ethernet cards and modems. In certain aspects, the input/output module 310 is configured to connect to a plurality of devices, such as an input device 314 and/or an output device 316. Exemplary input devices 314 include a keyboard and a pointing device, e.g., a mouse or a trackball, by which a user can provide input to the computer system 300. Other kinds of input devices 314 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback, and input from the user can be received in any form, including acoustic, speech, tactile, or brain wave input. Exemplary output devices 316 include display devices such as an LCD (liquid crystal display) monitor, for displaying information to the user.

According to one aspect of the present disclosure, the above-described gaming systems can be implemented using a computer system 300 in response to processor 302 executing one or more sequences of one or more instructions contained in memory 304. Such instructions may be read into memory 304 from another machine-readable medium, such as data storage device 306. Execution of the sequences of instructions contained in the main memory 304 causes processor 302 to perform the process steps described herein. One or more processors in a multi-processing arrangement may also be employed to execute the sequences of instructions contained in memory 304. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., such as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 300 can include clients and servers. A client and server are generally remote from each other and typically interact through a communication network. The relationship of client and server arises by virtue of computer programs running on the respective computers and having a client-server relationship to each other. Computer system 300 can be, for example, and without limitation, a desktop computer, laptop computer, or tablet computer. Computer system 300 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer-readable medium" as used herein refers to any medium or media that participates in providing instructions to processor 302 for execution. Such a medium may take many forms, including, but not limited to, non-volatile media, volatile media, and transmission media. Non-volatile media include, for example, optical or magnetic disks, such as data storage device 306. Volatile media include dynamic memory, such as memory 304. Transmission media include coaxial cables, copper wire, and fiber optics, including the wires that comprise bus 308. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As the user computing system 300 reads game data and provides a game, information may be read from the game data and stored in a memory device, such as the memory 304. Additionally, data from the memory 304 servers accessed via a network, the bus 308, or the data storage 306 may be read and loaded into the memory 304. Although data is described as being found in the memory 304, it will be understood that data does not have to be stored in the memory 304 and may be stored in other memory accessible to the processor 302 or distributed among several media, such as the data storage 306.

Figure 4:
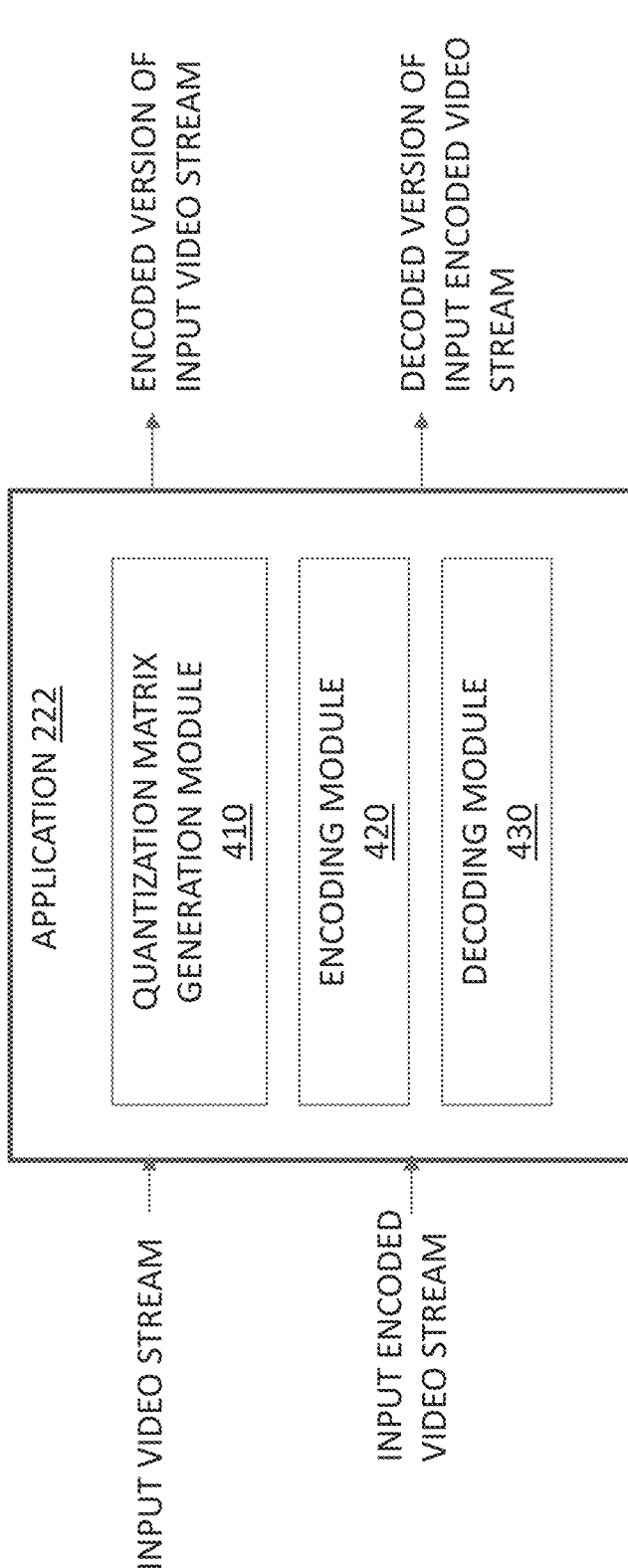
FIG. 4 depicts a block diagram of an example configuration for implementing quantization matrices in video compression systems, in accordance with an illustrative embodiment.

FIG. 4 depicts a block diagram of an example configuration for implementing quantization matrices in video compression systems, in accordance with an illustrative embodiment. Application 222 is the same as application 222 in FIG. 2.

Application 222 uses a method of matrix generation that mitigates quantizer matrix implementation overhead. In implementations of application 222, a quantizer matrix is generated based on a formula modeled, based on, or derived from the fundamental quantizer matrices of the AV1 standard. As such, rather than storing all the matrices in the specification and encoding or decoding based on a selected option from the available sets in the fundamental quantizer matrices, the formula may be solved based on preset parameters in order to generate the matrix. Implementations of application 222 may be used and incorporated into video compression standards to optimize storage, reduce computing time, and increase applicable hardware/software implementations.

In implementations of application 222, rather than storing all numbers in the fundamental quantizer matrices, quantization matrix generation module 410 can derive the numbers at the beginning of or during the encoding or decoding. Module 410 may perform differential coding on the fundamental quantizer matrices. For example, assume two matrices: M1: [1 2 3 4 5 6 7 8] and M2: [1 2 3 4 6 6 7 8]. Differential coding may be applied to determine a difference between the two matrices. That is, with the first matrix being M1: [1 2 3 4 5 6 7 8], the difference is represented as M2-M1: [0 0 0 0 0 1 0 0]. Since there is only 1 non-zero value, the position (i.e., position: 6, value: 1) is stored to represent the value difference rather than the entire matrix M2, which reduces the storage overhead significantly.

In some implementations, module 410 will only need to store one set of the quantizer matrices (e.g., the first set). Then, module 410 stores the difference between other matrix sets and the first set. In some implementations, run-length coding is applied to determine and store the difference.

According to implementations of application 222, the fundamental quantizer matrices are made derivable so that module 410 can derive the matrix instead of storing all numbers in the matrix. In some implementations, a set of parameters contributing to the design of the derivable quantizer matrix formula may include the low frequency component being more important than the high frequency component. Accordingly, the formula to generate the quantizer values from high values to low values can be designed based on this set of parameters. In some implementations, the formula could have a parameter to control a decay rate. The formula and different decay rates may be used to generate different sets of quantizer matrices.

In some implementations, the formula may be applied on AC frequency components (i.e., the quantizer value of the position, (x, y), where x>0 and y>0). The quantizer value of the DC coefficient may be set to a value larger than the value for the first AC frequency component. By non-limiting example, the quantizer values for DC to the 7th AC component could be (32, 31, 31, 32, 35, 40, 70, 80).

In implementations of application 222, video coding overhead and overall cost of the system is reduced based on the design implementing the formula because the decoder does not have to store the values in all quantizer matrix sets. Instead, module 410 stores the formula and the different decay rates and generates the quantizer matrix sets.

In implementations of module 410, an exemplary formula to generate the quantizer value q of the position, (x, y), may be as follows (hereafter referred to as "first equation"):

$$q = a*x^2 + b*x*y + c*y^2 + d*x + e*y + f \qquad \text{Equation (1)}$$

where x and y are the horizontal and vertical positions in a transform block. The parameters denoted by a, b, c, d, e, and f can be pre-defined or signaled in the bitstream. Accordingly, only the coefficients and the quadratic equation (i.e., first equation) are stored, and the quantization matrix is generated.

In some implementations of module 410, least-square fitting is used to fit the generated values to better mimic, for example, matrices in the AV1 standard. To further refine the data, each of the data values may be converted to (e.g., 16-bit) floating point.

According to some implementations of module 410, an exemplary formula to generate the quantizer value q from the position (x, y) may be as follows (hereafter referred to as "second equation"):

$$q = f * e^{\wedge}(g * (x + y)) \qquad \text{Equation (2)}$$

where x and y are the horizontal and vertical positions in a transform block. In some embodiments, the parameters denoted by e, f, and g may be pre-defined or signaled in the bitstream (e.g., based on the input video).

If an input video stream is being encoded, module 410 uses a set of parameters to generate a quantization matrix. Encoding module 420, using the quantization matrix, encodes a frame in the input video stream. The encoding generates a compressed video stream corresponding to the input video stream.

If, instead, an input video stream is being decoded, module 410 uses a set of parameters to generate a quantization matrix. Decoding module 430, using the quantization matrix, decodes a frame in the input video stream. The encoding generates an uncompressed video stream corresponding to the input video stream.

FIG. 5 depicts a flowchart of an example process for implementing quantization matrices in video compression systems, in accordance with an illustrative embodiment. Process 500 can be implemented in application 222 in FIG. 2.

At block 502, the process generates, using a first set of parameters, a first quantization matrix. At block 504, the process encodes, using the first quantization matrix, a frame in an uncompressed video stream, the encoding generating a compressed video stream corresponding to the uncompressed video stream. At block 506, the process generates, using a second set of parameters, a second quantization matrix. At block 508, the process decodes, using the second quantization matrix, a second frame in a second compressed video stream, the decoding generating a second uncompressed video stream corresponding to the second compressed video stream. Then the process ends.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the terms "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No clause element is to be construed under the provisions of 35 U.S.C. § 112, sixth paragraph, unless the element is expressly recited using the phrase "means for" or, in the case of a method clause, the element is recited using the phrase "step for."

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

Embodiments consistent with the present disclosure may be combined with any combination of features or aspects of embodiments described herein.

The invention claimed is:

1. A computer-implemented method, comprising:
   generating, using a first set of parameters, a first quantization matrix;
   generating a quantization value in the first quantization matrix using a first formula;
   adjusting, using a least square fitting, the quantization value; and
   encoding, using the first quantization matrix, a frame in an uncompressed video stream, the encoding generating a compressed video stream corresponding to the uncompressed video stream.

2. The computer-implemented method of claim 1, further comprising:

selecting, based on a characteristic of the uncompressed video stream, the first set of parameters.

3. The computer-implemented method of claim 1, further comprising:

selecting, based on a signal within the uncompressed video stream, the first set of parameters.

4. The computer-implemented method of claim 1, wherein the first set of parameters comprises a set of coefficients of the first formula, and wherein the quantization value corresponds to an x-y position in the frame.

5. The computer-implemented method of claim 1, further comprising:

generating, using a second set of parameters, a second quantization matrix; and decoding, using the second quantization matrix, a second frame in a second compressed video stream, the decoding generating a second uncompressed video stream corresponding to the second compressed video stream.

6. The computer-implemented method of claim 5, further comprising:

selecting, based on a characteristic of the second compressed video stream, the second set of parameters.

7. The computer-implemented method of claim 5, further comprising:

selecting, based on a second signal within the second compressed video stream, the second set of parameters.

8. A non-transitory computer-readable medium storing a program, which when executed by a computer, configures the computer to:

generate, using a first set of parameters, a first quantization matrix;

generate a quantization value in the first quantization matrix using a first formula;

adjust, using a least square fitting, the quantization value; and encode, using the first quantization matrix, a frame in an uncompressed video stream, the encoding generating a compressed video stream corresponding to the uncompressed video stream.

9. The non-transitory computer-readable medium of claim 8, wherein the program, when executed by the computer, further configures the computer to:

select, based on a characteristic of the uncompressed video stream, the first set of parameters.

10. The non-transitory computer-readable medium of claim 8, wherein the program, when executed by the computer, further configures the computer to:

select, based on a signal within the uncompressed video stream, the first set of parameters.

11. The non-transitory computer-readable medium of claim 8, wherein the first set of parameters comprises a set of coefficients of the first formula, and wherein the quantization value corresponds to an x-y position in the frame.

12. The non-transitory computer-readable medium of claim 8, wherein the program, when executed by the computer, further configures the computer to:

generate, using a second set of parameters, a second quantization matrix; and decode, using the second quantization matrix, a second frame in a second compressed video stream, the decoding generating a second uncompressed video stream corresponding to the second compressed video stream.

13. The non-transitory computer-readable medium of claim 12, wherein the program, when executed by the computer, further configures the computer to:

select, based on a characteristic of the second compressed video stream, the second set of parameters.

14. The non-transitory computer-readable medium of claim 12, wherein the program, when executed by the computer, further configures the computer to:

select, based on a second signal within the second compressed video stream, the second set of parameters.

15. A system comprising:

a processor; and a non-transitory computer-readable medium storing a set of instructions, which when executed by the processor, configure the system to:

generate, using a first set of parameters, a first quantization matrix;

generate a quantization value in the first quantization matrix using a first formula;

adjust, using a least square fitting, the quantization value; and encode, using the first quantization matrix, a frame in an uncompressed video stream, the encoding generating a compressed video stream corresponding to the uncompressed video stream.

16. The system of claim 15, wherein the instructions, when executed by the processor, further configure the system to:

select, based on a characteristic of the uncompressed video stream, the first set of parameters.

17. The system of claim 15, wherein the instructions, when executed by the processor, further configure the system to:

select, based on a signal within the uncompressed video stream, the first set of parameters.

18. The system of claim 15, wherein the first set of parameters comprises a set of coefficients of the first formula, and wherein the quantization value corresponds to an x-y position in the frame.

\* \* \* \* \*